June 9, 1931.   L. H. PATTEN   1,809,528
AUTO HEATER
Filed April 17, 1930

L. H. Patten
Inventor
By C. A. Snow & Co.
Attorneys.

Patented June 9, 1931

1,809,528

UNITED STATES PATENT OFFICE

LINDLEY H. PATTEN, OF RUGBY, NORTH DAKOTA

AUTO HEATER

Application filed April 17, 1930. Serial No. 445,063.

This invention relates to motor vehicle heaters, the primary object of the invention being to provide novel means whereby the water in the cooling system of the motor may be utilized for heating the body of a motor vehicle.

An important object of the invention is to provide a device of this character which may be adjusted to vary the degree of heat thereby adapting the device for use in cold or medium cold weather.

A further object of the invention is to provide a heater of this character which may be readily and easily installed on the usual motor vehicle, eliminating the necessity of making extensive alterations in the construction of the motor vehicle, to install the device.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
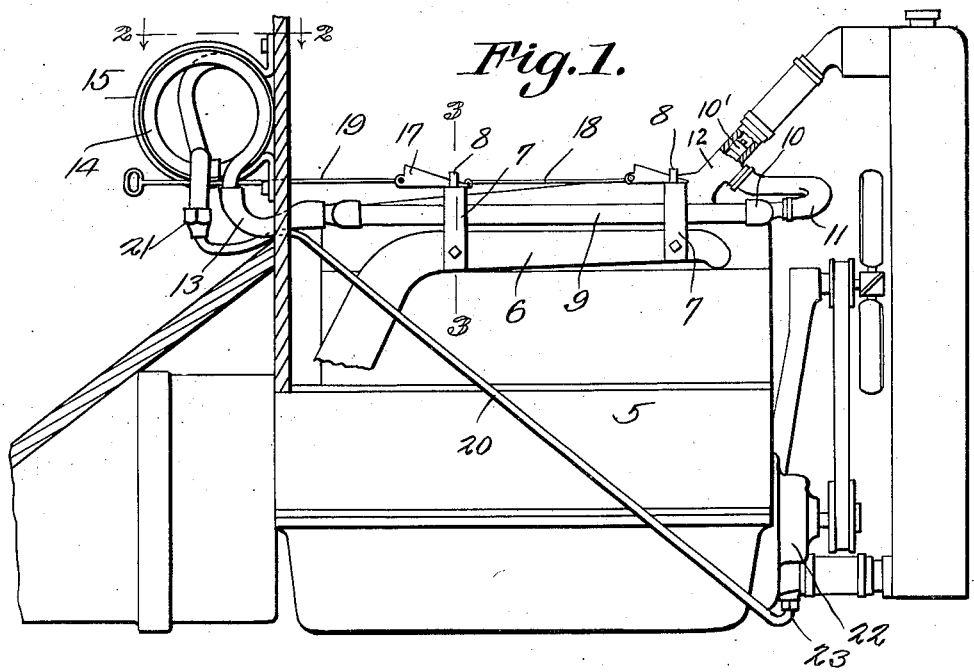
Figure 1 is a side elevational view illustrating a heating device constructed in accordance with the invention, as mounted on a motor.
Figure 2:
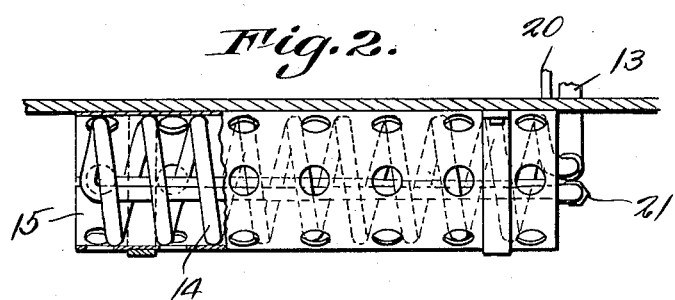
Figure 2 is a plan view of the heating coil of the device, part of the tube being broken away.
Figures 3, 4:
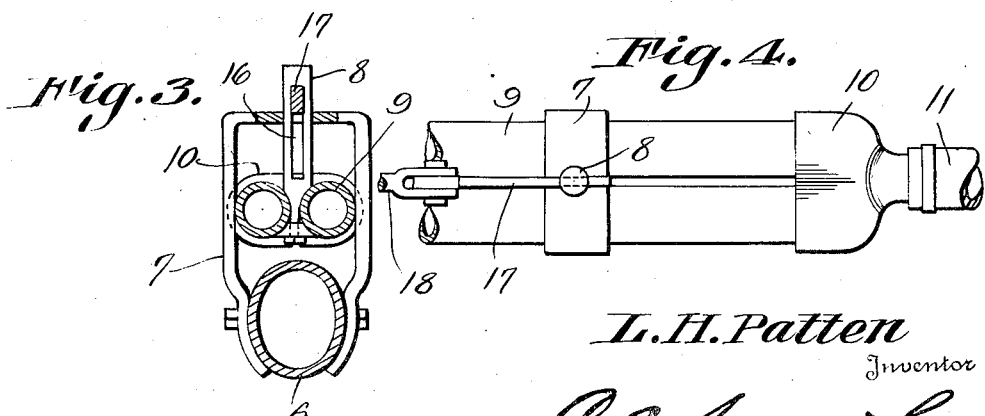
Figure 3 is a sectional view taken on line 3—3 of Figure 1.
Figure 4 is a fragmental plan view of the heating pipe of the device.

Referring to the drawings in detail, the reference character 5 designates an internal combustion engine, which includes the usual exhaust manifold. Secured to the exhaust manifold 6 are vertical yokes 7, which are formed with openings at their upper ends through which the arms 8 extend, the arms 8 being secured to the pipes 9 that have their ends connected by means of the pipes 10. The hose 11 connects with the pipe 10 at one end of the heater, the hose 11 being also connected with the pipe 12 leading from the water jacket of the engine and to which the usual radiator hose of the engine, is connected. The reference character 10' indicates a thermostatically controlled valve that opens when the water becomes hot, allowing the water to pass into the heater.

Connected with the pipe 10 at the rear ends of the pipes 9, is a hose or flexible pipe 13 that connects with the coil 14 positioned within the supporting tube 15, the tube 15 being provided with openings so that heat from the coil 14 may pass from the tube 15.

The arms 8 are formed with elongated openings 16 in which the wedges 17 move, the wedges resting on the upper ends of the yokes 7 to move thereover, the wedges being so constructed that when they are moved forwardly, the arms 8 and pipes 9 connected therewith will be elevated or moved away from the exhaust manifold 6 with the result that the heat directed to the pipes 9 will be decreased. Should it be desired to move the pipes 9 into closer engagement with the exhaust manifold 6, the wedges 17 are moved in the opposite direction.

Thus it will be obvious that due to this construction the temperature of the water passing through the pipes 9 may be regulated at the will of the operator.

Connecting the wedges 17, is a rod 18, while the rod 19 connects with the wedge 17 nearest to the instrument board of the vehicle to the end that the operator may by operating the rod 19 move the pipes 9 towards or away from the exhaust manifold.

The pipe 20 constitutes the return pipe of the system and connects with one end of the coil 14, at 21, the opposite end of the pipe 20 having connection with the pump housing 22, at 23 so that a complete circulation of the water is provided at all times, and the heated water from the radiator is maintained in a heated condition in its passage from the radiator to the coil 14, by the heat from the exhaust manifold.

From the foregoing it will be obvious that due to the construction shown and described, the hot water of the cooling system of a motor vehicle, may be utilized for heating the interior of the motor vehicle in cold weather.

It is of course understood that suitable valves not shown are provided for controlling the passage of water through the coils of the heating system.

I claim:

1. In combination with the radiator of an internal combustion engine of a motor vehicle, a heater comprising pipes, means for establishing communication between the pipes and radiator to allow water from the radiator to pass through the pipes, means for adjustably supporting the pipes in proximity to the exhaust manifold of the engine, and a coil within the body portion of the vehicle and in communication with the pipes to direct heat to the vehicle.

2. In combination with the radiator of an internal combustion engine of a motor vehicle, a heater comprising pipes, means for establishing communication between the pipes and radiator, yokes extending from the exhaust manifold of the engine, and within which the pipes are supported, wedge members operating adjacent to the yokes for moving the pipes vertically with respect to the exhaust manifold to regulate the heat of the pipes, a coil positioned within the vehicle and in communication with the pipes to direct hot water to the vehicle.

3. In combination with the radiator of an internal combustion engine of a motor vehicle, a heater comprising pipes, means for supporting the pipes adjacent to the engine to be heated by the engine, means for establishing communication between the pipes and radiator of the engine, a coil of pipe supported within the body portion of the vehicle, a tube in which the coil is mounted, said tube having openings to allow air to pass therefrom, and means for adjusting the pipes with respect to the engine.

In testimony that I claim the foregoing as my own, I have hereto affixed my signature.

LINDLEY H. PATTEN.